United States Patent
Dell et al.

(10) Patent No.: US 6,327,664 B1
(45) Date of Patent: Dec. 4, 2001

(54) POWER MANAGEMENT ON A MEMORY CARD HAVING A SIGNAL PROCESSING ELEMENT

(75) Inventors: Timothy J. Dell, Colchester; Bruce G. Hazelzet; Mark W. Kellogg, both of Essex Junction; Christopher P. Miller, Underhill, all of VT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/302,916

(22) Filed: Apr. 30, 1999

(51) Int. Cl.[7] ....................................................... G06F 1/32
(52) U.S. Cl. ........................... 713/323; 713/320; 713/322
(58) Field of Search ................................. 713/300, 320, 713/322, 323, 324, 500, 600

(56) References Cited

U.S. PATENT DOCUMENTS

| | | | |
|---|---|---|---|
| 5,560,024 | 9/1996 | Harper et al. | 713/322 |
| 5,638,542 | 6/1997 | Nikjou | 713/323 |
| 5,689,714 | 11/1997 | Moyer | 713/310 |
| 5,692,202 | 11/1997 | Kardach et al. | 713/324 |
| 5,721,933 | 2/1998 | Walsh et al. | 713/300 |
| 5,727,221 | 3/1998 | Walsh et al. | 713/310 |
| 5,901,103 | * 5/1999 | Harris, II et al. | 365/226 |

* cited by examiner

*Primary Examiner*—Xuan M. Thai
(74) *Attorney, Agent, or Firm*—William N. Hogg

(57) ABSTRACT

An improved memory module and its use in a computer system is provided. The module includes a DSP first and second individually addressable banks of memory chips. The first bank is configured to function principally under the control of the signal processing element and the second bank is configured to function principally under the control of a system memory controller, although all the portions of each of the memory banks is addressable by both the signal processing element and the system memory controller. Both banks of memory chips can be placed in at least one higher power state and at least one lower power state by either the system memory controller or the DSP. The activity of each bank is sensed while in the higher power state, and the condition of each of the banks is sensed with respect to any activity during operation of the memory bank at the higher power state. The power state of each bank can be changed by either the signal processing element or the system memory controller responsive to preselected conditions of each bank. Each memory bank is returned to a predetermined known condition when changing from a lower power state to a higher power state. This is especially important when the memory bank assigned to the system controller is placed in another state by the DSP.

14 Claims, 3 Drawing Sheets

POWER MANAGEMENT ON A MEMORY CARD HAVING A SIGNAL PROCESSING ELEMENT

FIELD OF THE INVENTION

This invention relates generally to memory cards and their use in computer systems, and more particularly to the use in computer systems of memory cards having signal processing units on board and having at least one and preferably a plurality (i.e. at least two) of addressable banks of memory chips wherein at least a portion of at least one memory bank is individually addressable or activatable.

BACKGROUND ART

Memory cards such as SIMMs and DIMMs have increasingly more memory and more function being added thereto. Particularly, it has been proposed that signal processing elements such as digital signal processors (DSPs) be provided on board the cards to perform various functions independently of the system memory controller. These DSPs can operate on the memory when it is not being accessed by the system memory controller to perform various tasks.

This provides an inexpensive processor specific to each card to enhance the operation of the memory card. Additionally, as the amount of memory and the functions supplied on each card increase the power requirement for the card with large amounts of memory and more functions, this power requirement can be substantially increased. This is especially critical where the system is battery operated and/or the heat dissipation capability is limited. While the system memory controller generally is programmed to reduce the power level of the memory system, this is generally not a completely satisfactory solution since the memory controller operates on all of the memory cards and generally does not reduce the power state of the memory until the period of non-use amounts to a substantial period of time. Also the system memory controller is not normally programmed to operate on individual portions of memory banks. Thus there is a need for a memory card and system for the memory card to operate in a computer to selectively and expeditiously reduce power to individual banks of memory or portions thereof when the banks of memory or portion thereof are not being accessed by either the system memory controller or the DSP.

SUMMARY OF THE INVENTION

According to the present invention an improved memory card and its use in a computer system is provided. The card includes a signal processing element, preferably a DSP and at least one and preferably first and second individually addressable banks of memory chips. The first bank of chips or optionally a portion of the first bank of chips is configured to function principally under the control of the signal processing element and the second bank is configured to function principally under the control of a system memory controller in the computer system, although all the portions of each of the memory banks is addressable by both the signal processing element and the system memory controller. Both banks of memory chips or portion thereof can be placed in at least one higher power state and at least one lower power state by either the system memory controller or the DSP. The activity of each bank of memory and portion thereof is sensed while in the higher power state, and the condition of each of the banks of memory or portion thereof is sensed with respect to any activity during operation of the memory bank of memory at the higher power state. The power state of each bank of memory can be changed by either the signal processing element or the system memory controller responsive to preselected conditions of each bank. Each memory bank or portion thereof is returned to a predetermined known condition when changing from a lower power state to a higher power state. Preferably this condition is that condition, in the case of the memory bank under the control of the system memory controller that it was in following the last access by the system memory controller, and in the case of the memory bank or portion thereof under the control of the DSP, is a given preselected condition. This is especially important when the memory bank assigned to the system controller is placed in another state by the DSP.

DESCRIPTION OF THE PREFERRED EMBODIMENT

Figure 1:
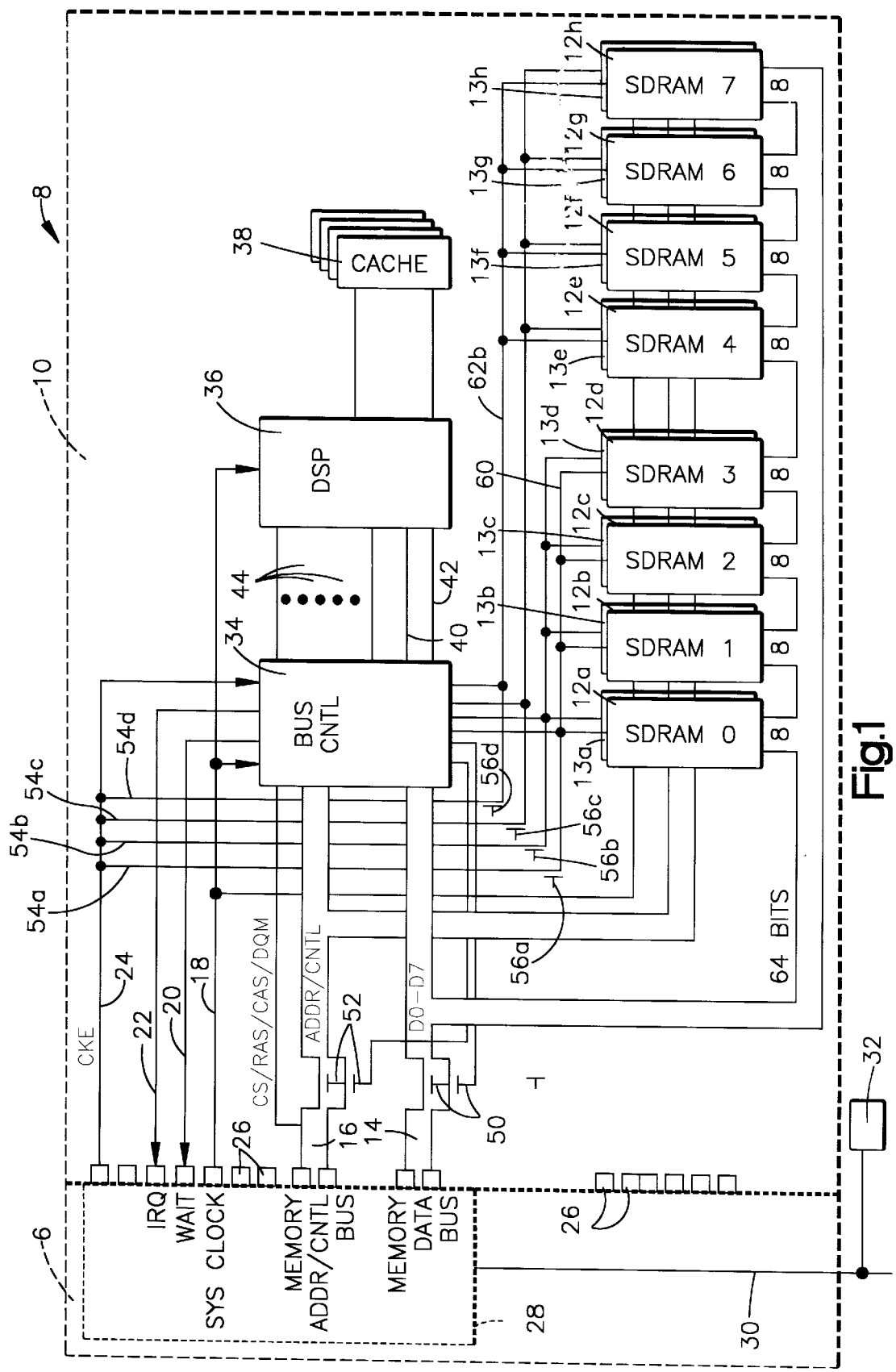
FIG. 1 is a high level diagram of a computer system with a memory card according to this invention.

Referring now to the drawings and for the present to FIG. 1, one embodiment of the present invention is shown as embodied in a personal computer 6. A memory module 8 such as a DIMM or SIMM is provided which includes a printed circuit card 10 having a plurality of synchronous DRAMs (SDRAMs) 12a–12h constituting a first bank of memory chips and 13a–13h constituting a second bank of memory chips. The synchronous DRAMs 12a–12h and 13a–13h, are conventional SDRAMs. The SDRAMs of each bank 12 and 13 are divided into two sections or portions, 12a–12d being 12 low, 12e–12h being 12 high, 13a–13d being 13 low and 13e–13h being 13 high. Each of these sections is individually addressable and will be described presently.

The circuit card 10 has a memory bus which includes a memory data bus 14 and a memory address/control bus 16. A system clock line 18, a wait line 20, an interrupt request line 22, and a clock enable (CKE) line 24 are also provided. Memory data bus 14, memory 4 address/control bus 16, system clock 18, wait line 20, interrupt request line 22, and clock enable line 14 are all connected to I/O connectors sometimes referred to as pins 26. The I/O connectors 26 provide an interface to a system memory controller 28, which is a part of the memory subsystem of computer 6. The system memory controller 28 also controls a PCI bus 30 (and optionally other buses not shown). The PCI bus 30 has thereon devices such as a codec 32.

The memory card 10 also has a memory bus controller 34 which is connected to the memory data bus 14, the memory address/control bus 16, the system clock 18, the wait line 20, the interrupt request line 22 and the clock enable line 24. The bus controller 34 is connected to a signal processing element 36 which in the preferred embodiment is a digital signal processor (DSP). A particularly useful DSP is any one of the TMS 320C54X family manufactured by Texas Instruments, Inc. This particular DSP family includes an external cache memory 38. The bus controller 34 and DSP 36 are interconnected by a chip address bus 40, a chip data bus 42 and control lines 44 that pass various control signals between the bus controller 34 and the DSP 36. This type of connection is well known in the art.

The memory data bus 14 has FET switches 50 therein. (It is to be understood that the memory data bus 14 is comprised of multiple lines, one for each bit and there is an FET 50 for each bit line.) The memory data bus 14 may be an 8 bit bus, a 16 bit bus, a 32 bit bus, or a 64 bit bus, and indeed any size data bus which includes whatever number of data lines are required. Also there are FET switches 52 in the system address/control bus 16.

The system clock line 18 is also connected to the DSP 36 in the preferred embodiment; however, it is to be understood that a separate clock could be provided for the DSP if different timing is used on the card from the timing used in the CPU. However, the preferred embodiment for most instances is to use the system clock for clocking the functions and signals on the memory module. The clock enable line 24 has four branches 54a–54d connected to the banks of memory chips 12a–12h and 13a–13h through FET switches 56a–56d to provide individual clock enable signals directly to the chips 12a–12h and 13a–13h without going through the bus controller 34 so that the chips can be addressed when they are in the lowest power state as will be described presently. The line 54a connects with the chips 12 low, the line 54b connects with chips 13 low, the line 54c connects with chips 13 high and line 54d connects with chips 12 high. Thus each of these sections memory can be individually accessed and controlled.

Many tasks of the DSP are accomplished when the memory module is not being addressed for either a read or write function or other function by the CPU memory controller 28. Thus the FETs 50, 52 and 56a–56d are in an open position when these tasks are taking place to disconnect the memory controller 28 from access to the memory. If however, when the CPU wishes to access the memory module, the FET's 50, 52, and 56a–56d are closed, the memory controller 28 can address the memory module 8 on the memory data bus 14 and memory address/control bus 16 to perform conventional read/write operations from and to selected SDRAMs 12a–12h and 13a–13h.

The present invention accommodates several levels of reduced power operation for the memory card 8 and provides for both the system memory controller 28 or the memory bus controller 34 to place the banks of memory chips 12a–12h or 13a–13h or sections thereof in one of the reduced power levels. Generally speaking, however, the system memory controller conventionally is programmed to require a significantly longer period of inactivity before placing either of the banks of chips in a reduced power mode than the memory bus controller; and, moreover, the system memory controller conventionally is not programmed to place individual banks of memory or sections thereof into a reduced power mode, but rather acts on all of the memory on the card 8.

JEDEC standards define three different reduced power modes for conventional SDRAMs. In the preferred embodiment of the invention, all three different reduced power modes, i.e. 1) clock suspend mode; 2) power down mode; and 3) self refresh mode are supported. In the clock suspend mode the internal clock on all affected SDRAMS remains in the state it was prior to entering the clock suspend mode. Only one clock cycle is required to bring the affected SDRAMS from the clock suspend mode to the active mode or from the active mode to the clock suspend mode. The clock suspend mode offers the least power saving of these three modes.

In the power down mode all of the banks are maintained in the precharged condition but all the receivers are deactivated except for the clock enable. The internal clocks on all of the SDRAMS are also frozen in this mode. The DRAMS must be returned to the active state from this mode for refresh, and thus this state can last no longer than the duration of the interval between refresh cycles before the SDRAMS must be returned to active state for refresh. This is an intermediate state of power saving of these three modes of reduced power.

The self refresh mode is used if it is expected that the duration of the reduced power requirement will last longer than the cycle time of a refresh cycle. In this mode, only the clock enable signal is active, with all the other receivers being turned off. The SDRAMS perform a self refresh function and thus the internal clocks of each of the SDRAMS are frozen, but are selectively partially activated to perform the self refresh function.

As indicated above either the system memory controller 28 or the memory bus controller 34 can place either of the memory banks of chips 12a–12h or 13a–13h in any of the power down modes. Additionally, since DSPs typically have a narrower bus width than the system bus of memory data bus 14, if the DSP is working only on either the high or low portion of each bank the other portion can be put into a reduced power mode. Hence a clock enable signal is sent to each of the high and low portions of each bank of memory chips.

Since both the system memory controller and the DSP through the memory bus controller have access to both banks of memory chips and both sections thereof and can rewrite data and change the condition of the SDRAM chips, it is necessary to accurately and precisely control the condition of the chips when they are being accessed by either the system memory controller or the DSP. This is especially true of the system memory controller since the system memory controller "expects" to find the memory in the condition it was in when the system memory controller last completed an access to the memory. If the memory is in a condition other than at the completion of the last access by the system memory controller, for example because of an intervening access by the DSP to place the memory in a powered down condition, then a command issued by the system memory controller may be invalid for that particular condition of the memory which, of course, could have serious consequences. Therefore in conjunction with both the system memory controller 28 and the memory bus controller 34 under the direction of the DSP 36 being able to reduce the power level of any bank of memory chips 12a–12h or 13a–13h, a very rigorous protocol must be established for governing access to the banks of memory chips; and, just as importantly a protocol governing the specific condition of the chips after each access and entering a power down mode and before returning access to either the system memory controller 28 or the memory bus controller after a power down mode is required.

Since both the system memory controller 28 and the DSP 36 through the memory bus controller 34 can access both the memory banks 12a–12h and 13a–13h and the high and low sections thereof and put either bank or sections thereof into different power down modes, it is necessary that certain conditions must prevail before either bank can be placed in a power down mode; and, also it is necessary to restore each bank to a predetermined or pre known condition before access to that bank can again be granted. Expressed another way, since both memory banks 12a–12h and 13a–13h and/or sections thereof are shared between two or more processors (i.e. the DSP 36 and the system processor which controls the system memory controller 28) a methodology is required that ensures that the memory banks 12a–12h and 13a–13h and sections thereof are given appropriate commands at all times based on the then current status of the memory.

In the preferred embodiment, the wait line must be inactive, indicating that the memory is available for access, and this condition is programmed to exist when all of the following conditions apply:

1) both of the memory banks 12a–12h and 13a–13h are in the same condition they were left in after the last system access. Thus the system will find the memory banks in the condition that it "expects" to find them based on their condition following the last system access. Hence, the system will pick up after its last access, and the command will not be an invalid command based on the system expecting the condition to be different than it is;

2) the memory banks or portions or sections thereof that are principally assigned to the DSP are in the inactive/standby (or idle) state—this being the default state when not fully powered down;

3) all of the FET switches are closed to permit access by the system memory controller 34 to the banks of memory 12a–12h and 13a–13h including through the clock enable lines 54a–54d; and 4) the outputs of the memory bus controller 34 to the system bus 14 and 16 are disabled.

Conversely the wait line will be active, signaling the nonavailability of the memory for access by the system memory controller 28, if any one or more of the following conditions exist:

1). the memory bank or portions thereof assigned to the system memory controller are not in the condition it was in following the last access by the system memory controller 28 (this condition would occur when the DSP 36 has initiated access to or changed the power state of the memory bank assigned to the system memory controller 28;

2) the memory bank or portion thereof assigned to the DSP is in a state other than an inactive/standby (idle) state;

3) any of the FET switches are open (inactive) preventing signals from the system memory controller 28 from accessing the memory banks; or 4) any of the bus controller 34 outputs to the system bus are active.

Since the memory bus controller 34 monitors the system memory controller 28 commands, it knows what commands are issued and can react to them as needed. Either the system memory controller 28 or the system bus controller 34 may act on one or more portions of memory to put them in a reduced power mode. It is up to the memory bus controller 34 to monitor the condition of all of the banks of memory at all times to insure that any commands issued by it are "legal" memory operations for the current state.

Figure 2:
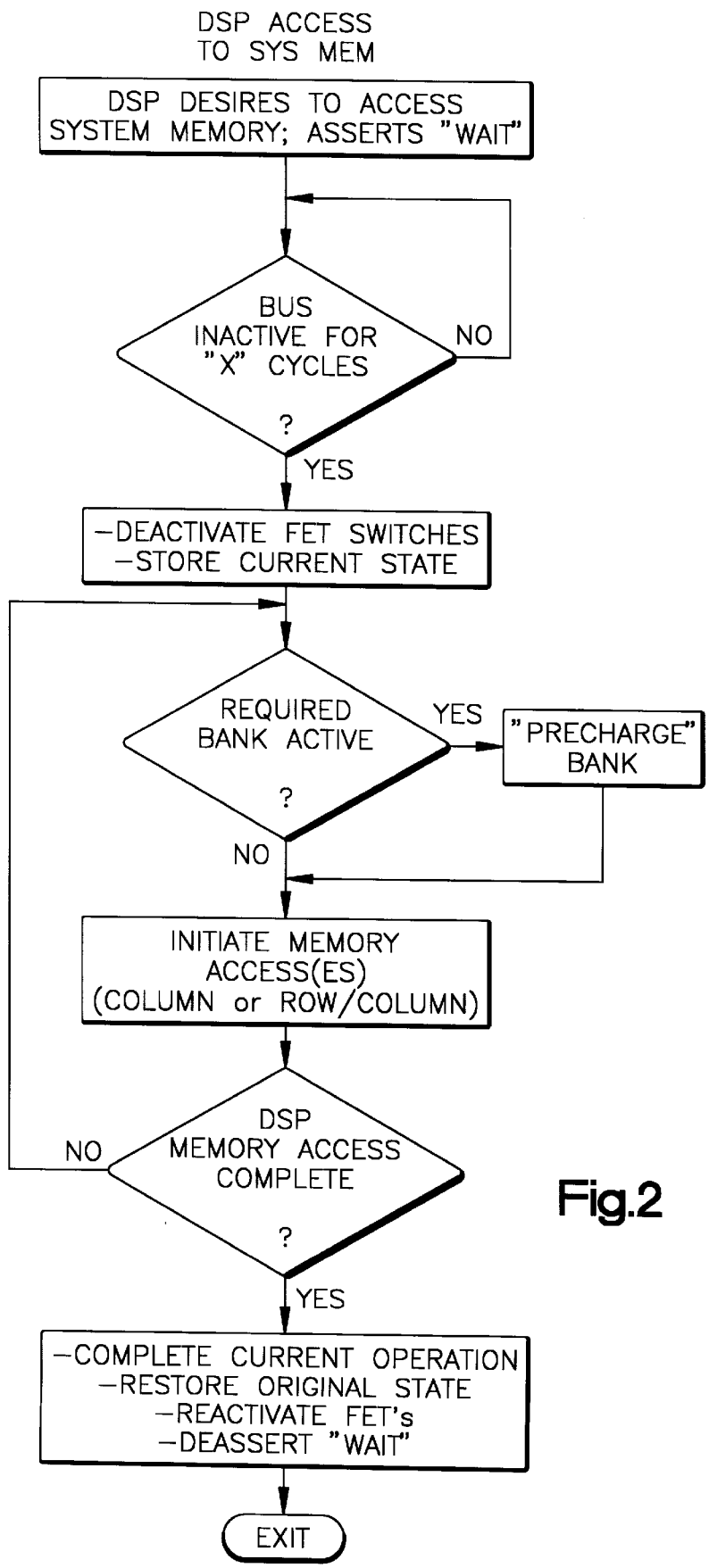
FIG. 2 is a flow diagram of the DSP access to system controller memory.
Figure 4:
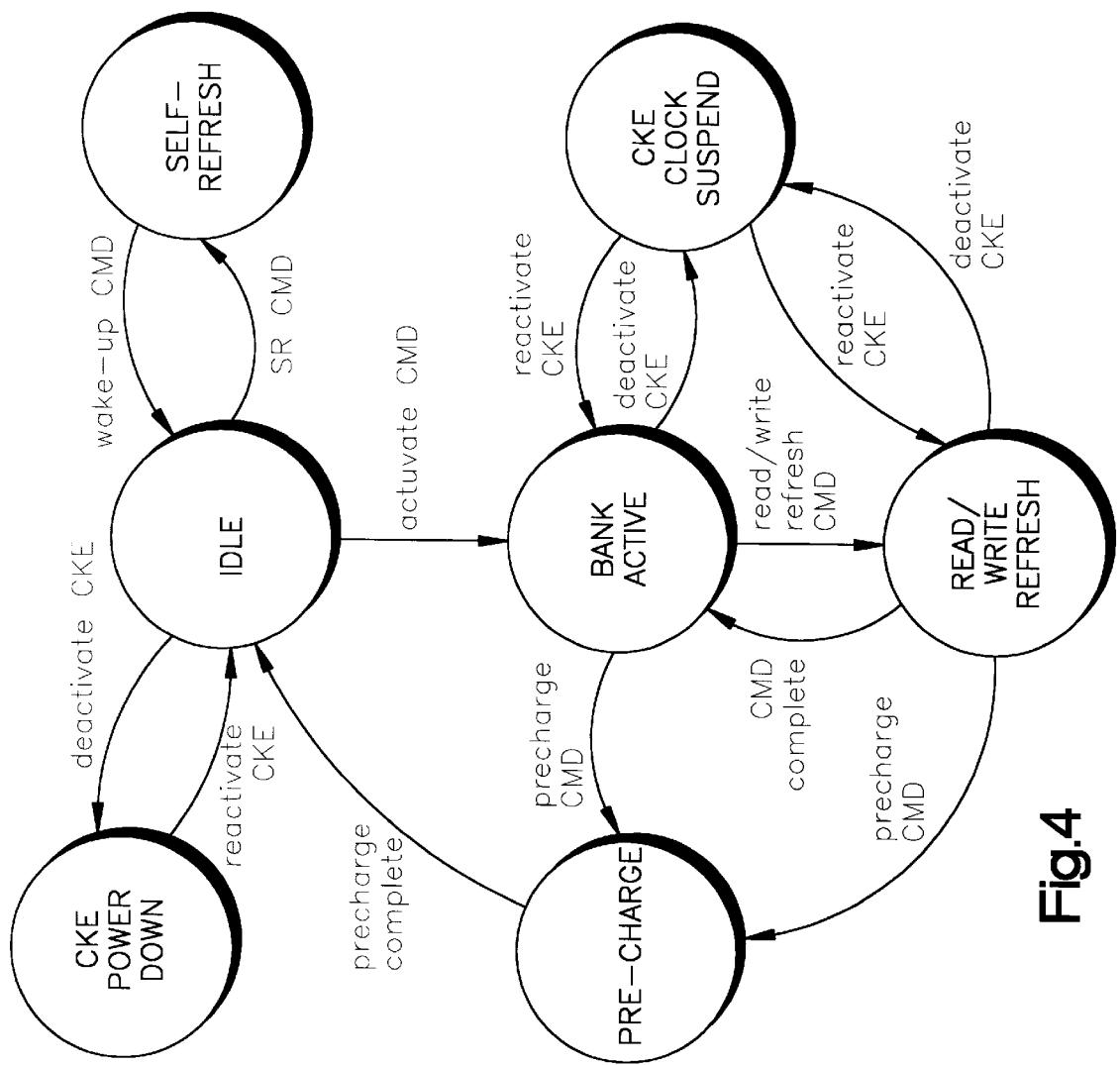
FIG. 4 is a state diagram of the operation of the CPU memory.
Figure 3:
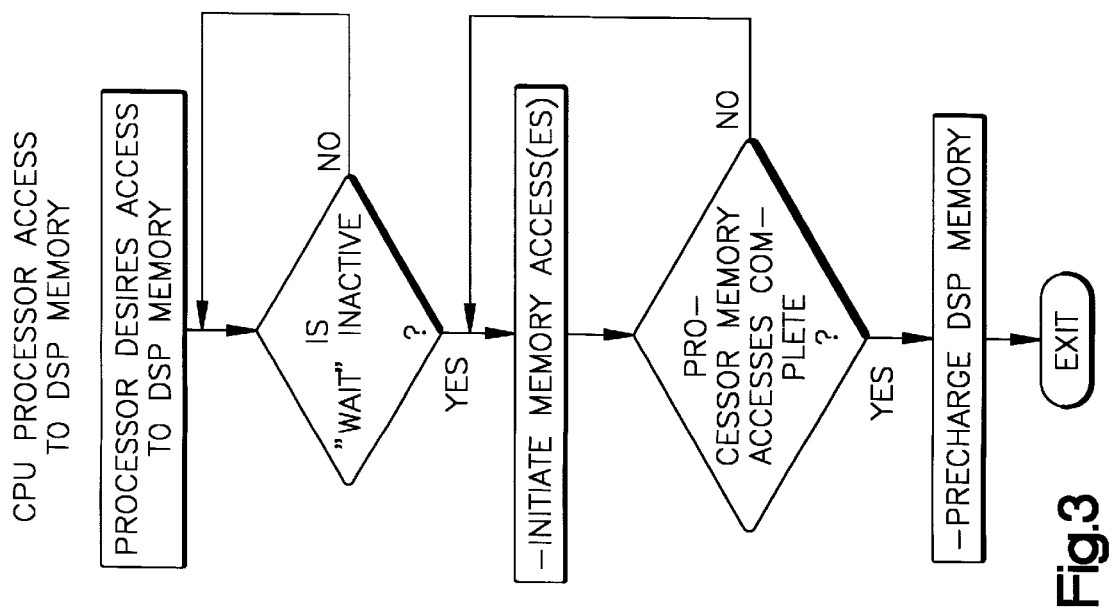
FIG. 3 is a flow diagram of the system CPU access to DSP controlled memory.

FIG. 2 is a flow diagram of the operation of the DSP 36 access to system memory bank 13a–13h, and FIG. 3 is a flow diagram of the operation of the system memory controller 28 to the DSP memory bank 12a–12h. FIG. 4 is a state diagram of the operation of the system memory controller 28. (The state diagram of the operation of the bus controller 34 under control of the DSP 36 is the same, except that after the read/write/refresh operations are complete, the memory is always returned to the precharge state and not to bank active.)

EXAMPLE I

Memory Module with more than one 'physical' memory banks (e.g. 12a–12h and 13a–13h), with at least one physical bank (e.g. 12a–12h) allocated to the DSP, and the remaining physical bank(s) (e.g. 13a–13h) allocated to the system.

This case offers the maximum flexibility to the DSP 36, as it has primary control over at least one physical bank of memory (e.g. 12a–12h).

In this case, the system has direct control over one or more physical banks, and may utilize the CKE signal to de-power any or all of the system memory. The memory assigned to the system would react immediately to this operation, unless the memory is not currently available (e.g. being accessed by the DSP). If the memory is not available, the WAIT line 20 would already be active, and the system would re-issue the command once the WAIT line is inactive. If subsequently activated by the DSP, the memory would be returned to its previous (low power) state once the operation(s) is completed.

The memory uniquely assigned to the DSP would generally be under direct DSP control—and may be in any state including a low power mode. When one or more unique physical banks are permanently allocated to the DSP, the DSP memory will not be directly affected by the system CKE operation—since the CKE signals will be sourced by the bus controller, not the external system.

Local CKE control: The physical memory space allocated to the DSP, is placed in the lowest power mode possible, when not in use. (For this example, this is defined as one physical bank of memory assigned to the DSP, with any remaining physical banks of memory assigned to the system.) Accesses to all other physical memory banks on the memory card 8 are still permitted (as long as those banks are in the appropriate state), since the bus controller will ensure the DSP memory is not disturbed (CKE held inactive).

As this physical bank is assigned to the DSP, only a limited set of transfers would be expected to this memory from the system processor/memory controller. As such, any attempted accesses from the system to this memory would result in a WAIT response from the DSP memory—and the processor access would be held-off until the DSP memory is returned to an accessible state. In this implementation, the physical memory bank assigned to the DSP would ALWAYS be placed in an 'Inactive/Standby" state prior to making this memory accessible to the system During any change in state of the DSP memory, the FET switches would be disabled to permit the generation and transmission of 'local' address and command signals.

As such, the DSP memory can be maintained in a low power state, whenever unneeded, independent of the condition (state) of the remaining memory on the assembly.

EXAMPLE II

Memory Module 8 with one or more physical banks of memory, with a portion of the memory (e.g. 12a–12h) assigned to the DSP (generally this will be LESS than one physical bank).

Since the 'DSP' memory is not physically separate from the 'system' memory on this assembly (as a unique physical bank), unique control of the power level of the memory assigned to the DSP is not possible. In this case, the DSP, through the memory bus controller 34, monitors bus activity to the memory, and can reduce the power level of the memory on the assembly, on a per-bank basis, based on the system and DSP 36 activity to that memory space. (This can also be done in Example I above). As in Example I, the DSP 36 would maintain control over CKE 24 (or similar power management signals) at the memory devices when FET switches 56a–56d are turned off, and would return a 'wait' response if the accessed memory is not immediately available. As before, during the change in memory states, the FET switches 56a–56d would be disabled (turned off) to prevent bus contention.

In a system containing memory of this type, the operating system preferably resides in an address range not included on the DSP Memory Module. By so-doing, the probability that the local memory will be in an inactive state is increased—thereby maximizing the benefits of this invention.

Accordingly, the preferred embodiments of the present invention have been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A method of controlling the power utilized by a memory card in a computer system which includes a signal processing element on said card and at least one bank of memory chips, and wherein said at least one bank has at least a first portion thereof configured to principally function under the control of the signal processing element and a second portion configured to function principally under the control of a system memory controller in said computer system, and wherein each of said first and second portion of memory is addressable by both the signal processing element and said system memory controller, and wherein each portion of memory can be placed in at least a higher power state and a lower power state by either said system memory controller or said signal processing element, comprising the steps of;

changing the power state of both said first portion of memory chips and said second portion of memory by either said signal processing element or said system controller responsive to preselected conditions of each portion, sensing the activity of each portion of memory chips before the power state is changed from said higher power state to said lower power state;

sensing the condition of each of said portion of memory during any operation with respect to said memory bank; and always returning each memory portion to a predetermined known condition when changing from said lower power state to said higher power state.

2. The invention as defined in claim 1 wherein there are at least first and second memory banks, and wherein said first memory bank constitutes said first portion of memory and said second memory bank constitutes said second memory portion.

3. The invention as defined in claim 2 wherein the second bank of memory chips is restored to the condition at the completion of the last access thereto by said system memory controller when said second bank of memory chips is accessed by the signal processing element.

4. The invention as defined in claim 2 wherein said first bank of memory chips is placed in a condition of inactive/standby before access thereto by said system memory controller.

5. The invention as defined in claim 1 wherein a wait signal is delivered to said system memory controller if the requested bank of memory chips is unavailable.

6. The invention as defined in claim 5 wherein said wait signal is generated if any of the following conditions exist:
   a) said second bank of memory chips is not in the condition of last access by the system memory controller;
   b) said first bank of memory chips is not in an inactive/standby condition;
   c) the system memory controller does not have physical access to either of said banks of memory; or
   d) either of the banks of memory chips do not have physical access to the system controller.

7. The invention as defined in claim 1 wherein an interrupt request signal is generated when the signal processor needs to be serviced by said system memory controller.

8. The invention as defined in claim 1 wherein there are at least three reduced power levels including a highest reduced power level which is a clock freeze mode, an intermediate reduced power level which is an inactive/standby mode, and a lowest reduced power level which is a self refresh mode.

9. In combination, a computer system including a system memory controller which generates clock enable signals, and a memory module, said module comprising a signal processing element, at least one bank of memory chips, wherein said at least one bank has at least a first portion thereof configured to principally function under the control of the signal processing element and a second portion configured to function principally under the control of a system memory controller in said computer system, each of said first and second portion of memory being addressable by both the signal processing element and said system memory controller, wherein each portion of memory can be placed in at least a higher power state and a lower power state by either said system memory controller or said signal processing element, logic circuitry to change the power state of both said first portion of memory chips and said second portion of memory by either said signal processing element or said system controller responsive to preselected conditions of each portion including circuitry to deliver clock enable signals selectively responsive directly to said system controller or responsive to the signal processing element, circuitry to sense the activity of each portion of memory chips before the power state is changed from said higher power state to said lower power state;

circuitry to sense the condition of each of said portion of memory during any operation with respect to said memory bank; and circuitry to always return each memory portion to a predetermined known condition when changing from said lower power state to said higher power state.

10. The invention as defined in claim 9 wherein there are at least first and second memory banks, and wherein said first memory bank constitutes said first portion of memory and said second memory bank constitutes said second memory portion.

11. The invention as defined in claim 9 including logic circuitry to provide a wait signal to said system memory controller if the requested bank of memory chips is unavailable.

12. The invention as defined in claim 11 wherein said wait signal is generated if any of the following conditions exist:

a) said second bank of memory chips is not in the condition of last access by the system memory controller;
b) said first bank of memory chips is not in an inactive/standby condition;
c) the system memory does not have physical access to either of said banks of memory; or
d) either of the banks of memory chips do not have physical access to the system controller.

13. The invention as defined in claim 9 including logic circuitry to generate an interrupt request signal when the signal processor needs to be serviced by said system memory controller.

14. The invention as defined in claim 9 wherein there are at least three reduced power levels including a highest reduced power level which is a clock freeze mode, an intermediate reduced power level which is an inactive/standby mode, and a lowest reduced power level which is a self refresh mode.

* * * * *

UNITED STATES PATENT AND TRADEMARK OFFICE
CERTIFICATE OF CORRECTION

PATENT NO. : 6,327,664 B1
DATED : December 4, 2001
INVENTOR(S) : Timothy J. Dell, Bruce G. Hazelzet, Mark W. Kellogg, Christopher P. Miller It is certified that error appears in the above-identified patent and that said Letters Patent is hereby corrected as shown below:

<u>Column 8, claim 6,</u>
Line 11, delete "does not" and change "have" to "has";
Line 13, delete "does not" and change "have" to "has".

Signed and Sealed this

Twelfth Day of March, 2002

Attest:

JAMES E. ROGAN
*Attesting Officer*     *Director of the United States Patent and Trademark Office*